United States Patent Office 3,817,905
Patented June 18, 1974

3,817,905
COATING COMPOSITION
Robert Wendell Lerner, Hossein Hayati, and John Robert Flasch, Adrian, Mich., assignors to Stauffer Chemical Company, New York, N.Y.
No Drawing. Filed Dec. 30, 1971, Ser. No. 214,438
Int. Cl. C08g 51/04
U.S. Cl. 260—37 R    11 Claims

ABSTRACT OF THE DISCLOSURE

A coating composition containing a hydrolyzed and condensed organotrihydrocarbonoxy silane, a hydrolyzable titanium compound of the formula $Ti(OZ)_4$ or hydrocarbon soluble partial hydrolyzate thereof, wherein Z is an aliphatic or aromatic hydrocarbon radical or a hydroxylated aliphatic or aromatic hydrocarbon radical of less than 20 carbon atoms and a particulate solid. The coating composition will impart galvanic protection to metal surfaces coated therewith.

---

The present invention relates to a coating composition, particularly a coating composition containing particulate solids, and more particularly to a zinc filled coating composition which, when applied to a metal surface, will impart galvanic protection thereto.

Many of the coating compositions used heretofore when applied to a surface provide a soft, powdery coating when cured. Furthermore, it was difficult to obtain a uniform coating when particulate solids, such as zinc were incorporated therein. Likewise, many of the coating compositions, when applied to metal substrates often cracked upon drying thereby exposing the substrates to the environment.

Therefore, it is an object of this invention to provide a protective coating for metal surfaces. Another object of this invention is to provide a coating composition containing particulate solids. Still another object of this invention is to provide an appropriate binder for incorporating zinc therein. Still another object of this invention is to prepare a coating composition which may be readily applied to a surface in the manner of a paint. A further object of this invention is to provide a coating composition which will cure on a metal substrate to form a hard abrasion resistant, tightly adherent film.

The foregoing objects and others which will become apparent from the following description are accomplished in accordance with this invention, generally speaking, by providing a binder composition containing a hydrolyzed organotrihydrocarbonoxy silane and a hydrolyzable titanium compound, which can be combined with particulate solids to form a paint-like coating composition having a satisfactory shelf life.

The organotrihydrocarbonoxy silanes used in the preparation of the binder composition may be represented by the formulae:

$$RSi(OR')_3 \text{ and } RSi(OR''OR''')_3$$

in which R and R' are aliphatic and aromatic hydrocarbon radicals having up to about 10 carbon atoms and more preferably from about 1 to 6 carbon atoms, R" is a divalent hydrocarbon radical having from 2 to 6 carbon atoms, and R''' is the same as R' or hydrogen. Examples of suitable monovalent hydrocarbon radicals represented by R, R' and R''' are alkyl radicals such, methyl, ethyl, butyl, hexyl, octyl and decyl; and aryl radicals such as, phenyl, tolyl and xylyl. Also, R can be any alkenyl radical, such as, vinyl, allyl, hexenyl and butadienyl. Divalent hydrocarbon radicals represented by R" above are ethylene, trimethylene, tetramethylene, hexamethylene, phenylene and the like.

Suitable organotrihydrocarbonoxy silanes are methyltrimethoxysilane,
methyltriethoxysilane,
methyltripropoxysilane,
methytributoxysilane,
methyltrioctoxysilane,
ethyltriethoxysilane,
propyltrimethoxysilane,
propyltributoxysilane,
propyltrioctoxysilane,
propyltridecoxysilane,
butyltrimethoxysilane,
butyltriethoxysilane,
butyltributoxysilane,
butyltrioctoxysilane,
butyltridecoxysilane,
butyltriphenoxysilane,
hexyltrimethoxysilane,
hexyltriethoxysilane,
hexyltributoxysilane,
hexyltrioctoxysilane,
hexyltriphenoxysilane,
phenyltrimethoxysilane,
phenyltriethoxysilane,
phenyltributoxysilane,
phenyltrioctoxysilane,
allyltrimethoxysilane,
allyltriethoxysilane,
vinyltrimethoxysilane,
vinyltriethoxysilane,
vinyltributoxysilane,
butadienyltrimethoxysilane,
methyl tri-(2-methoxyethoxy) silane,
ethyl tri-(4-ethoxy-butoxy) silane,
ethyl tri-(2-butoxy-ethoxy) silane,
butyl tri-(2-ethoxy-ethoxy) silane,
hexyl tri-(2-methoxy-ethoxy) silane,
phenyl tri-(2-ethoxy-ethoxy) silane,
methyl tri-(propylene glycol) silane,
butyl tri-(ethylene glycol) silane,
phenyl tri-(ethylene glycol) silane, and mixtures thereof.

These organotrihydrocarbonoxy silanes may be prepared by various methods described in the literature. For example, the hydrocarbonoxy silanes may be prepared by a Grignard-type synthesis using the corresponding hydrocarbon chloride and an alkylorthosilicate. The general reaction is:

$$RX + Si(OR')_4 + Mg \rightarrow RSi(OR')_3 + MgXOR'$$

where R and R' are the same as represented above and X is a halogen. Generally, heating in the range of from about 50° C. to about 130° C. is necessary. It may be necessary to add a small amount of a reagent such as methyl magnesium chloride to initiate the reaction.

Alternatively, methyltrichlorosilane may be reacted with ethanol in the presence of ammonia to form methyltriethoxysilane and ammonium chloride. Phenyltrihydrocarbonoxy silane may likewise be obtained in an analogous manner by using phenylchlorosilanes.

The organotrihydrocarbonoxy silanes may also be prepared by reacting finely divided silicon in the presence of an alcohol or phenol in a neutral or acid phase at a temperature of from 20 to 360° C., separating the silane formed from the reaction mixture and thereafter reacting the thus formed silane with an unsaturated hydrocarbon in the presence of a conventional catalyst.

The hydrocarbonoxy silanes of the formula $$RSi(OR''OR''')_3$$

are prepared by reacting a methyl trichlorosilane with the corresponding monoethers of alkylene glycols or mixtures thereof to produce HCl and the silane. The alkylene glycol-ethers are produced by the normal reactions of the corresponding alcohols (R′′′OH) with an alkylene glycol in a 1:1 addition.

The organotrihydrocarbonoxy silanes are mixed with sufficient water to provide at least 0.6 moles of water per hydrocarbonoxy group, and more preferably from about 1.0 to 4.5 moles of water per hydrocarbonoxy group present on the silicon atom.

These organotrihydrocarbonoxy silanes are hydrolyzed and condensed to the extent that the SiO₂ content ranges from about 5 to 40 percent on a weight basis. Particularly good results have been obtained with a condensate containing from about 15 to 30 percent SiO₂.

Titanium compounds which are operative herein include a hydrolyzable titanium compound of the formula Ti(OZ)₄ or aliphatic or aromatic hydrocarbon soluble partial hydrolyzates thereof. In the titanium compounds, Z is an aliphatic or aromatic hydrocarbon radical of less than 20 carbon atoms or a hydroxylated aliphatic or aromatic hydrocarbon radical of less than 20 carbon atoms.

Specific examples of titanium compounds which are operative herein are titanium esters of monohydric alcohols, such as tetraisopropyl titanate, tetra (2-ethylhexyl) titanate, tetrabutyl titanate and tetrastearyl titanate; and esters of polyhydric alcohols such as octylene glycolyl titanate and titanates of tetraethylene glycol and glycerine and esters of aromatic alcohols such as tetracresyl titanate. The titanates of the polyhydric alcohols can be those which contain unreacted hydroxyl groups as well as those in which all of the hydroxyl groups have reacted with the titanium. Partial hydrolyzates of any of the above titanates are operative. The partial hydrolyzates are benzene soluble polyesters which have at least one

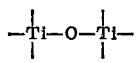

linkage in the molecule.

The titanium compounds may be combined with the silanes in any suitable manner to form the binder compositions. In some instances, it may be advantageous to admix the titanium compound with the hydrocarbonoxy silanes prior to hydrolysis and condensation or the titanium compound may be added at any time after hydrolysis and simultaneous condensation have been initiated up to the time or point that the particulate solids are admixed with the hydrolyzed composition.

A sufficient amount of titanium compound should be incorporated in the binder composition to improve the physical properties such as hardness, solvent resistance and adhesion characteristics of the coating composition. Although the amount may vary considerably, the amount of titanium compound in the coating composition generally ranges from about 0.1 to about 5 percent and more particularly from about 0.5 to about 2.0 percent by weight based on the weight of the hydrocarbonoxy silane. Good results have been obtained when the titanium compound was present in the coating composition in an amount of from 1.0 to 1.5 percent by weight.

Although it is not essential, it is preferred, that a solvent be employed in the preparation of the binder compositions. Suitable solvents include the higher boiling ethers, such as, monoalkylene glycol monoalkyl ethers, dialkylene glycol monoalkyl ethers, dialkylene glycol dialkyl ethers, monoalkylene glycol dialkyl ethers; ketones, such as, acetone; alcohols, such as, ethanol, isopropanol, butanol, hexanol, diacetone alcohol; glycols, such as, polyethylene glycols; hydrocarbon solvents, such as, hexane, heptane, benzene, toluene, xylene; chlorinated hydrocarbon solvents; water and mixtures thereof. The drying time, viscosity and so forth, may be adjusted by proper choice of solvents or mixtures thereof. The solvent to hydrocarbonoxy silane ratio is subject to wide variation depending on the characteristics desired in the finished binder. Thus, the ratio may lie anywhere within the limits of about 0.5:1 to 10:1.

Although the amount of acid necessary for the hydrolysis of the organtrihydrocarbonoxy silane is not critical, it is preferred that sufficient acid be present to provide a pH of from about 1.0 to about 5.5 and more preferably from about 1.4 to 4.5. Generally the amount of acid, particularly hydrochloric acid may range from about 0.001 to about 0.08 and more preferably from about 0.005 to about 0.05 percent by weight. Other inorganic acids such as sulphuric and hydrofluoric acid may be used either alone or in conjunction with hydrochloric acid.

Also, monobasic and dibasic organic acids free of hydroxy groups and having the requisite strength may be used as well as metal chlorides, nitrates and sulfates, where the metal is a member of Group III or IV of the Periodic Table. Examples of suitable organic acids are acetic acid, butyric acid, caproic acid, capric acid, palmitic acid, oleic acid, oxalic acid, fumaric acid, crotonic acid, acrylic acid, maleic acid, malonic acid, succinic acid, glutaric acid, adipic acid, suberic acid, sebacic acid and halogenated carboxylic acids. Other organic acids which may be used are benzoic acid, toluene sulfonic acid and alkyl phosphoric acids in which the alkyl groups contain from 1 to 4 carbon atoms.

Generally the amount of organic acid will range from about 0.1 to about 1.0 percent and more preferably from about 0.3 to about 0.8 percent by weight based on the weight of the binder composition.

The techniques for preparing the binder composition of this invention are known in the art; however, it is preferred that the above silane be dissolved in an organic solvent and thereafter sufficient water, preferably an acidized water is added in an amount which will provide at least 0.6 moles per hydrocarbonoxy group present on the silicon atom. The solution is stirred and within a short period of time it will be evident that a definite exothermic reaction has occurred. As a result, the solution becomes quite warm, yielding a homogeneous, clear-liquid product.

The exact nature of the chemical reaction taking place between the organotrihydrocarbonoxy silane and water is not known with certainty and the present invention is not intended to be limited to any particular mode of reaction. It may, however, be postulated that what takes place is hydrolysis followed by intermolecular condensation polymerization which results in the elimination of molecules of water and/or alcohol between the silicon containing moieties. It is known, for example, that the reaction between water and the organotrihydrocarbonoxy silane produces alcohols and silanol groups. The silanol groups condense with each other and with the hydrocarbonoxy groups to form Si-O-Si linkages, water and alcohol.

The coating compositions of this invention, are prepared by mixing the binder composition resulting from the foregoing hydrolysis and condensation of the silane with finely divided particulate solids, preferably zinc dust, and thereafter applied to metal substrates to impart galvanic protection thereto. Frequently, it is desirable to employ in lieu of pure zinc dust, a mixture of zinc dust and a suitable filler, such as, calcium and magnesium metasilicate or minerals containing the same. Other fillers, particularly fibrous mineral fillers, such as, asbestos, fibrous talc, fibrous calcium metasilicate, gypsum and the like may also be incorporated with zinc dust in these coating compositions. Other additives which may be included in the coating compositions are coloring pigments, such as, iron oxide, cadmium sulfide, titanium dioxide and most of the lithopones.

The zinc-binder ratio is largely a matter of customer preference or of the specifications to be met. Generally, the binder to zinc ratio lies within the range of 50:50 to 10:90 on a weight basis. However, where a filler is included in the composition, such as, the previously-mentioned calcium and magnesium meta-silicates, then the binder to total particulate ratio (zinc and filler) may go from 10:90 to as high as 70:30 on a weight basis.

Generally, these coatings can be cured at ambient temperature in about 24 hours; however, if desired, the coating may be heat cured in an oven at temperatures ranging from about 100° F. to as high as 1000° F. At these elevated temperatures, the cure time will be substantially reduced.

The coatings conforming to the present invention have a flash point from about 80° F. to about 150° F. (Tag Open-Cup Method) and a pot life meeting the requirements of substantially any field of use.

These coating compositions may be applied to a cleaned metal substrate by painting, spraying or other conventional techniques known in the art. They display excellent adhesion on application and in many cases, the coating may be applied successfully to clean, steel surfaces without prior sand-blasting which is not possible with the prior coatings. Good adherence to damp or even wet steel galvanized surfaces has been achieved. The coating will not freeze, nor, is it in any way adversely affected by bright sunlight at tropical temperatures. The coating shows excellent resistance to abrasion, salt spray, fuels, and to organic solvents. It is easily pigmented, hence it can be employed without an overcoat.

Surprisingly, it was found that the coating compositions containing the titanium compounds are considerably harder than similar coatings prepared in the absence of the titanium compounds.

The invention is further illustrated by the following examples which are to be taken as in no way limitative thereof. All parts are by weight unless otherwise specified.

EXAMPLE 1

A binder composition is prepared by slowly adding with agitation 50 parts of methyltriethoxysilane to a reactor containing 11.25 parts of water, 23 parts of ethylene glycol monoethyl ether, 0.02 part of 32 percent hydrochloric acid and 1 part of tetrabutyl titanate and thereafter continuing to agitate the reaction mixture for about 2 hours at a temperature up to about 60° C.

The binder composition thus prepared above is mixed with zinc dust (2 to 7 microns) in a ratio of 30 parts binder to 70 parts zinc dust and thereafter applied to a lightly sand-blasted steel substrate. After drying for about 24 hours at room temperature, the coating is tested for hardness in accordance with the standard hardness test. In this test, a pencil lead is employed having varying degrees of hardness corresponding to the scale 1B, 2B, 3B, F, H, 2H, 3H, 4H, 5H, etc. These values represent a progressive increase in hardness. The pencil lead is held at a 45° angle relative to the zinc coating as laid down on the steel panel and moderate force is applied until the coating is removed. The coating exhibits a hardness of about 3H.

A similar composition prepared in the absence of tetrabutyl titanate exhibits a hardness value of about H.

EXAMPLE 2

A binder composition is prepared in accordance with the procedure described in Example 1, in which 10 parts of deionized water are added to a reactor containing 50 parts of methyltriethoxysilane, and 0.04 part of 32 percent hydrochloric acid, and 33 parts of ethylene glycol monoethyl ether and agitated for 1 hour. About 0.2 parts of tetrabutyl titanate is added to the reaction mass and agitated for an additional 0.25 hour.

The binder composition thus prepared is mixed with zinc dust (2 to 7 microns) in a ratio of 30 parts binder to 70 parts zinc dust and thereafter applied to a lightly sand-blasted steel substrate. After drying for about 20 hours at room temperature, the coating exhibits a hardness of about 2H.

A similar composition prepared in the absence of tetrabutyl-titanate exhibits a hardness value of less than 1H.

EXAMPLE 3

A binder composition is prepared in accordance with the procedure described in Example 1, in which about 36 parts of deionized water are added to a reactor containing 100 parts of methyltriethoxysilane, 0.08 part of 32 percent hydrochloric acid, 50 parts of ethylene glycol monoethyl ether and 0.45 part of tetrabutyl titanate and heated to about 30° C. for 2 hours.

When 30 parts of this binder is mixed with 70 parts zinc dust and applied on a clean steel panel, a coating having a hardness value of 5H is obtained.

EXAMPLE 4

The procedure in Example 1 for preparing a binder composition is repeated, except that 22.5 parts of deionized water are added to a reactor containing 100 parts of methyltriethoxysilane, 0.1 part of 32 percent hydrochloric acid, 63.5 parts of ethylene glycol monoethyl ether and 1.0 part of tetrabutyl titanate. The reaction mass is heated to a temperature of about 30° C. for 2 hours.

When 20 parts of this binder is mixed with 80 parts zinc dust and applied on a clean steel panel, a coating having a hardness value of 4H is obtained.

EXAMPLE 5

A binder composition is prepared in accordance with the procedure described in Example 1, in which 24.4 parts of deionized water are added to a reactor containing 100 parts of methyl triethoxysilane, 0.006 part of 32 percent hydrochloric acid, 53 parts of ethylene glycol monoethyl ether and 0.2 part of tetracresyl titanate. The reaction mass is heated to about 46° C. for three hours.

When 30 parts of this binder is mixed with 80 parts zinc dust and applied on a clean steel panel, a coating hardness of 4H is obtained.

EXAMPLE 6

A binder composition is prepared in accordance with the procedure described in Example 4, except that 1.0 part of isopropyldiorthotitanate $(Ti_2O)(OiC_3H_7)_6$ is substituted for the tetrabutyl titanate.

The binder composition thus prepared is then mixed with zinc dust (2 to 7 microns) in a ratio of 30 parts binder to 70 parts zinc dust and thereafter applied to a lightly sand-blasted steel substrate. The coated substrate exhibits a hardness value of about 4H.

When the above examples are repeated using other hydrocarbonoxy silanes, in the presence of other titanium compounds and particulate solids, coating compositions are obtained which have properties substantially the same as those of the specific examples.

Although specific examples are mentioned and have been herein described, it is not intended to limit the invention solely thereto but to include all the variations and modifications falling within the spirit and scope of the appended claims.

The invention claimed is:

1. A coating composition comprising zinc and a binder composition having an $SiO_2$ content of from 5 to 40 percent on a weight basis which is obtained from the cohydrolysis and cocondensation of a mixture containing a silane selected from the group consisting of $$RSi(OR')_3 \text{ and } RSi(OR''OR''')_3$$

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen and from 0.1 to 5 percent by weight based on the weight of the silane of a hydrolyzable titanium compound having the formula Ti(OZ)₄ and hydrocarbon soluble partial hydrolyzates thereof, wherein Z is selected from the group consisting of aliphatic hydrocarbon radicals having less than 20 carbon atoms, aromatic hydrocarbon radicals and hydroxylated derivatives thereof in the presence of sufficient water to provide at least 0.6 moles of water per hydrocarbonoxy group connected to the silicon atom and sufficient acid to provide a pH of from 1.4 to 5.5, the binder to zinc ratio being from 50:50 to 10:90 on a weight basis.

2. The coating composition of claim 1 wherein the silane is $$RSi(OR')_3$$

in which R and R' are hydrocarbon radicals having up to 10 carbon atoms.

3. The coating composition of claim 1 wherein the silane is $$RSi(OR''OR''')_3$$

in which R and R''' are hydrocarbon radicals having from 1 to 10 carbon atoms and R'' is a divalent hydrocarbon radical having from 2 to 6 carbon atoms.

4. The coating composition of claim 1 wherein the titanium compound is tetraisopropyl titanate.

5. The coating composition of claim 1 wherein the titanium compound is a benzene soluble polyester which has at least one

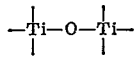

linkage in the molecule.

6. The coating composition of claim 1 wherein the coating composition contains in addition to the zinc, a filler material, the ratio of binder to zinc and filler being from 70:30 to 10:90 on a weight basis.

7. The coating composition of claim 6 wherein the filler material is an alkaline earth metal silicate comprising calcium and/or magnesium.

8. The coating composition of claim 6 wherein the filler material is a fibrous mineral substance.

9. The composition of claim 1 wherein an organic solvent is incorporated therein.

10. The coating composition of claim 9 wherein the solvent is an ether selected from the class consisting of monoalkylene glycol monoalkyl ethers, monoalkylene glycol dialkyl ethers, dialkylene glycol monoalkyl ethers and dialkylene glycol dialkyl ethers.

11. A method for preparing the coating composition of claim 1 which comprises cohydrolyzing and cocondensing a mixture containing a silane selected from the group consisting of $$RSi(OR')_3 \text{ and } RSi(OR''OR''')_3$$

in which R and R' represent hydrocarbon radicals having up to 10 carbon atoms, R'' is a divalent hydrocarbon radical having from 2 to 6 carbon atoms and R''' is selected from the group consisting of hydrocarbon radicals having up to 10 carbon atoms and hydrogen and from 0.1 to 5 percent by weight based on the weight of the silane of a hydrolyzable titanium compound having the formula TiOZ₄ and hydrocarbon soluble partial hydrolyzates thereof, wherein Z is selected from the group consisting of aliphatic hydrocarbon radicals having less than 20 carbon atoms, aromatic hydrocarbon radicals and hydroxylated derivatives thereof in the presence of sufficient water to provide at least 0.6 moles of water per hydrocarbonoxy group connected to the silicon atom and sufficient acid to provide a pH of from 1.4 to 5.5 to provide a binder having an SiO₂ content of from 5 to 40 percent on a weight basis and thereafter adding zinc to said binder composition in a binder to zinc ratio of from 50:50 to 10:90 on a weight basis.

References Cited

UNITED STATES PATENTS

| | | | |
|---|---|---|---|
| 2,721,855 | 10/1955 | Kin | 260—46.5 R |
| 2,768,993 | 10/1956 | Drummond | 260—37 SB |
| 3,392,036 | 7/1968 | McLeod | 106—1 |
| 3,457,221 | 7/1969 | Stengle | 260—46.5 R |
| 3,057,822 | 10/1962 | Rust et al. | 260—46.5 R |
| 2,736,721 | 2/1956 | Dexter | 260—37 SB UX |

LEWIS T. JACOBS, Primary Examiner

U.S. Cl. X.R.

106—1; 260—2 S, 2 T